June 9, 1959           G. D. DYNE           2,890,399
ELECTRODYNAMIC MACHINE AND CONTROL SWITCH THEREFOR
Filed June 2, 1955           4 Sheets-Sheet 1
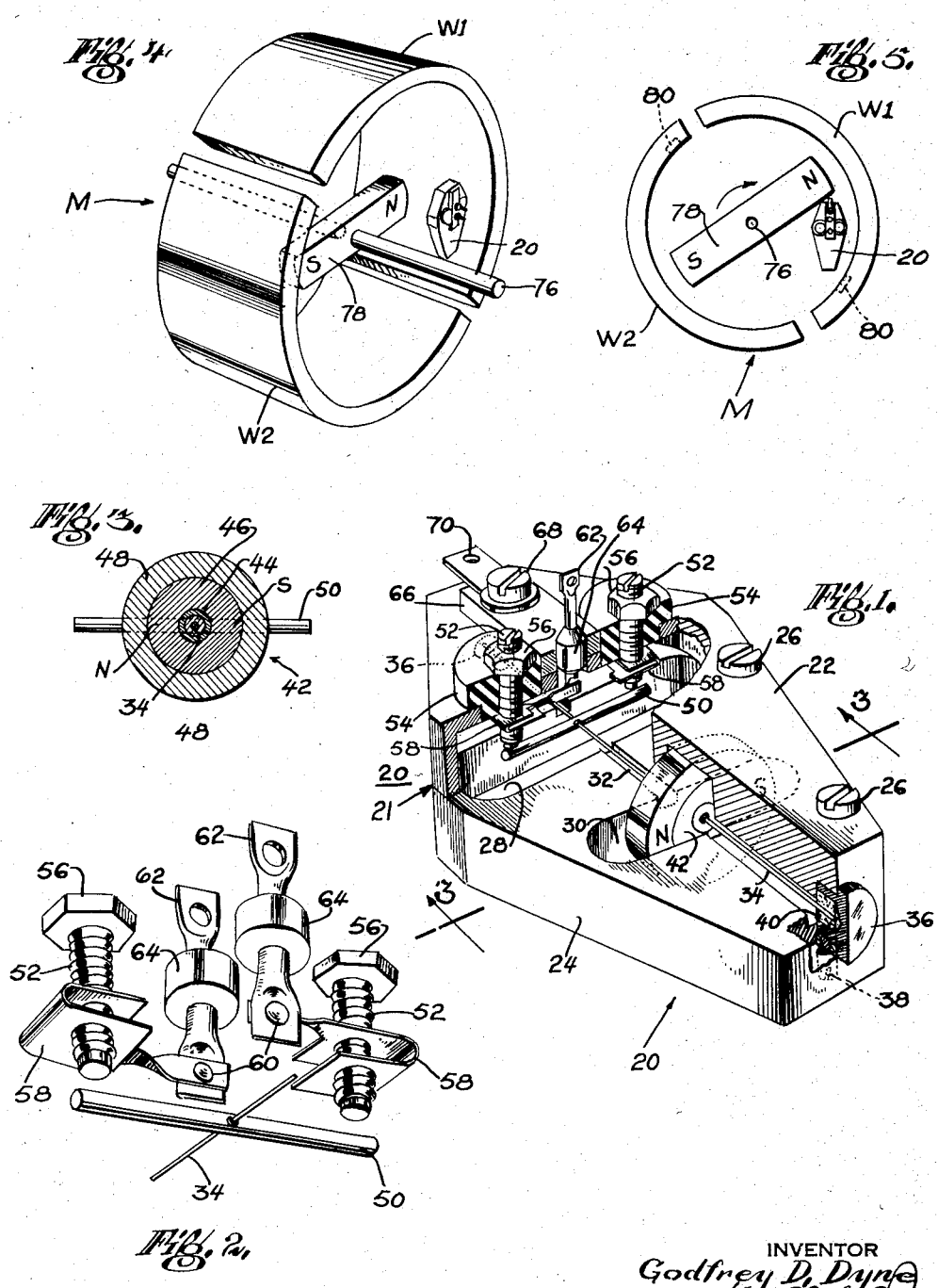
INVENTOR
Godfrey D. Dyne
BY
ATTORNEYS June 9, 1959
G. D. DYNE
2,890,399
ELECTRODYNAMIC MACHINE AND CONTROL SWITCH THEREFOR
Filed June 2, 1955
4 Sheets-Sheet 2
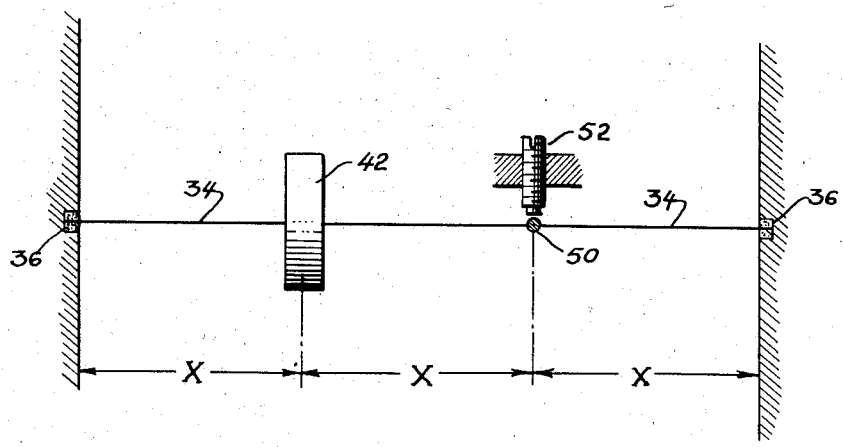
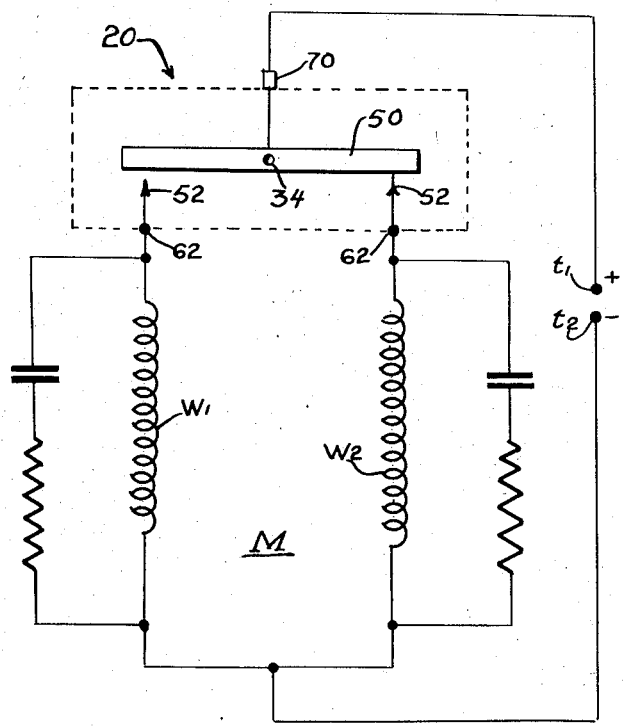
INVENTOR
Godfrey D. Dyne
BY Nast, Shields Price
ATTORNEY June 9, 1959  G. D. DYNE  2,890,399
ELECTRODYNAMIC MACHINE AND CONTROL SWITCH THEREFOR
Filed June 2, 1955  4 Sheets-Sheet 4
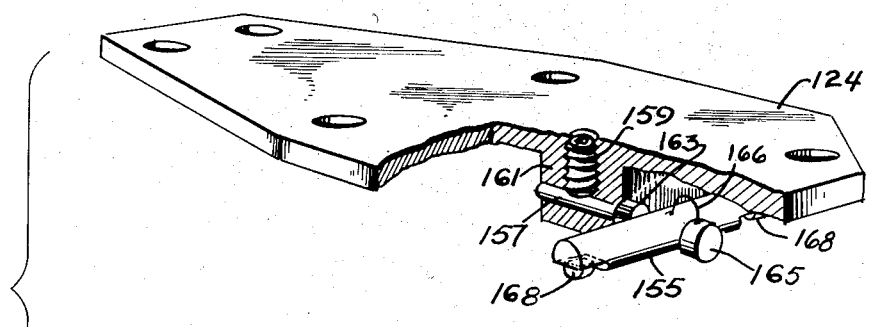
Fig. 11.
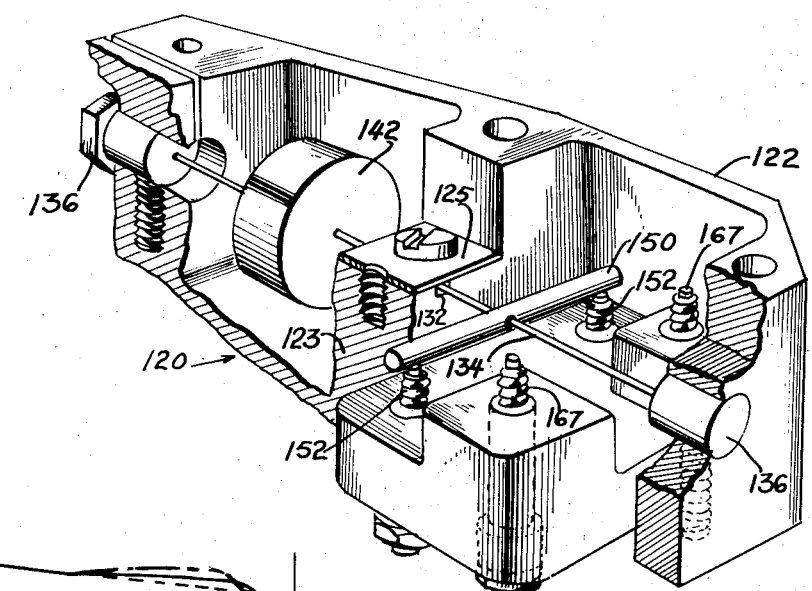
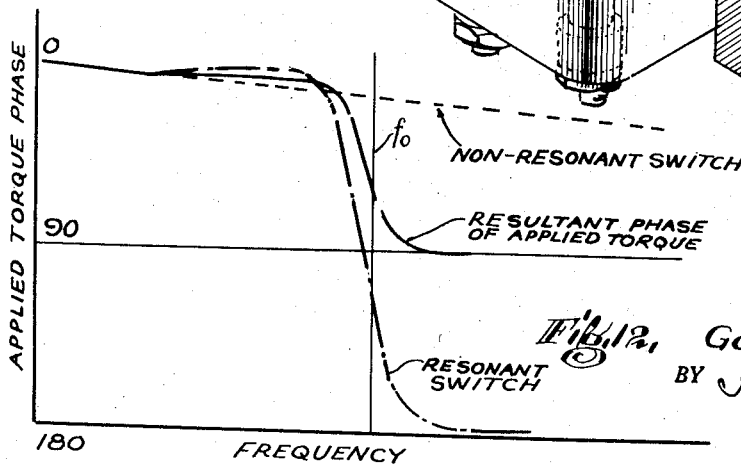
Fig. 12.
INVENTOR.
Godfrey D. Dyne
BY Hart, Shields & Price
ATTORNEYS United States Patent Office 2,890,399
Patented June 9, 1959

2,890,399
ELECTRODYNAMIC MACHINE AND CONTROL SWITCH THEREFOR

Godfrey D. Dyne, Ramsey, N.J., assignor to ACF Industries, Incorporated, New York, N.Y., a corporation of New Jersey Application June 2, 1955, Serial No. 512,599

13 Claims. (Cl. 318—254)

This invention relates to magnetically operated switches and to electrodynamic machines such as motors whose operational speed is controlled thereby.

There are many applications for electric motors where it is desirable to maintain the speed thereof substantially constant irrespective of changes in load, voltage or ambient conditions. Such constant speed is inherently obtained in some types of alternating current machines such as, for example, a synchronous motor driven from a constant frequency power source but in many applications a speed other than that equivalent to a subharmonic of the frequency of an available commercial power source is required. Furthermore, at isolated locations or in vehicles such as airplanes and trains, alternating current power is often not avaliable; or if present is subject to variations in frequency with resulting changes in motor speed unless elaborate means for frequency stabilizing are employed.

It is accordingly the object of this invention to provide an electrodynamic machine and a switching device therefor which will operate at a substantially constant predetermined speed, which are operable from a direct current supply, which are not effected by changes in voltage or load, which can withstand vibration and shock, which are substantially independent of variations in ambient temperature and pressure conditions, and which advance the electrical arts generally.

According to the present invention, the magnetically operated switch comprises an elongated torsional member whose ends are fixed and which is provided with electrical circuit controlling means such as one or more pair of contacts that are operated by the twisting of the member. A magnetic field producing element such as a magnet is attached to the torsional member so that the interaction of the flux of the magnetic field with the flux of a second magnetic field twists the member to operate the electrical contacts or other circuit controlling means. In another aspect of the invention, the second magnetic field is produced electromagnetically and the electrical energizing circuit therefor is controlled by the switch contacts whereby the frequency of operation of the complete system is a function of the frequency of the torsional oscillatory system of the switch. In one specific aspect such a complete system contemplates an electrodynamic machine of any of the types usually requiring a commutator with respect to which machine the magnetically operated switch is disposed so that the rotating field accompanying the machine rotor forms the second interacting magnetic field for operating the switch contacts. The contacts are connected in the energizing circuit of the machine stator windings to control the flow of magnetizing current therethrough. The rotor is thereby revolved at a speed corresponding to the rate of transfer of the switch contacts which in turn is dependent upon the resonating frequency of the torsionally oscillating system of the switch. It is to be understood, however, that oscillating characteristics of the switch are not limited to its application in controlling the speed of an electrodynamic machine, but can be readily adapted to other uses where frequency control is required such as the replacement for a tuning fork or of the cantilever vibrator element of a converter circuit.

These and other objects and aspects of the invention will be apparent from the following description of a specific embodiment of the invention which refers to several drawings wherein:

Fig. 1 is an isometric view of a first embodiment with portions of the housing broken away of the magnetically operated switch;

Fig. 2 is an isometric view showing the configuration of the switch contacts;

Fig. 3 is a partial sectional view on line 3—3 of Fig. 1;

Fig. 4 is a diagrammatic isometric view showing the relationship of the switch to the elements of an electrodynamic machine;

Fig. 5 is an end view of the switch and the electrodynamic machine shown in Fig. 4;

Fig. 6 is a diagrammatic view of the torsional system of the switch;

Fig. 7 is a wiring diagram of the switch and motor;

Fig. 11 is an isometric view of a second embodiment; and

Fig. 12 is a graphical view of a torque phase relationship of the second embodiment.

Figure 8:
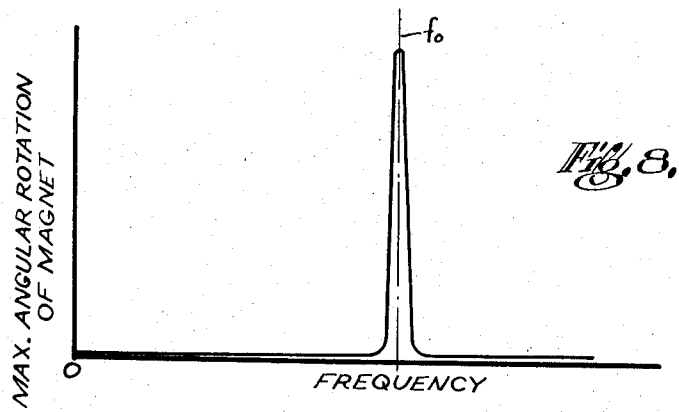
Fig. 8 is a graphical view showing the angular position of the switch magnet as a function of frequency.

As is shown in Fig. 1, the magnetically operated switch 20 comprises a generally rhombic shaped housing 21 having upper and lower portions 22 and 24 of a non-magnetic material such as aluminum which are held together by screws 26. Within the housing 20 are two spaced cavities 28 and 30 which are interconnected by a slot 32 located centrally of the housing along the longer diagonal thereof. Carried in the slot 32 is an elongated member such as the piano wire 34 whose ends are fixed in the housing, each end of the wire being anchored by means of a bushing 36 which is secured in a recess in the end of the housing by a set screw 38. Each of the bushings 36 is provided with a recess wherein the corresponding end of the wire 34 is held by soldering as at 40.

Also soldered to the wire 34 is a magnet assembly 42 which is located in the housing cavity 30. As is best shown in Fig. 3 the magnet assembly 42 consists of a central bushing 44 of a non-magnetic material such as brass having an axial aperture for the wire 34. Pressed over the bushing 44 is an annular magnetic member 46 of a material having a high magnetic retentivity such as "Cunife." To provide the magnet assembly 42 with a greater amount of an inertia, a ring 48 of brass or other non-magnetic material is pressed over the annular magnet 46.

A transverse member, such as the rigid contact bar 50 is disposed in the housing cavity 28 with an aperture at the bar midpoint engaging the wire 34 so that the ends of the bar extend substantially normally to the axis of the wire. The contact bar 50 is soldered or otherwise secured to the wire 34 so that the bar pivots about the longitudinal axis of the wire when the wire is twisted alternatively to bring the respective ends of the bar into conductive contact with two spaced stationary contacts 52. The shanks of the contacts 52 are threaded to engage respectively correspondingly threaded apertures in two insulating bushings 54 which are pressed into holes extending through the upper housing portion 22 so that the stationary contacts are electrically isolated with respect to the housing. The upper ends of the shanks of the stationary contacts 52 which project beyond the insulating bushings 54 are provided with lock nuts 56.

Each of the stationary contacts 52 is connectable in an external electrical circuit by means of a respective spring clip 58 (Fig. 2) of a conducting resilient sheet material such as Phosphor bronze. One end of each of the clips 58 is bent back upon itself through an arc of approximately 180 degrees and the parallel portions thereof are tapped to receive the threads of the associated stationary contact 52, the tendency of the parallel portions to spring apart providing a good electrical contact with the threads. The opposite end of each clip 58 is soldered or spot welded as at 60 to the lower end of a respective terminal 62 which is provided with an insulating bushing 64. The bushings 64 are fixed in spaced apertures in a terminal strip 66 (Fig. 1) which is secured to the top of the housing 20 by screws 68. The potential of contact bar 50 is maintained the same as that of the housing 20 which is electrically connected to an external circuit by means of a terminal strap 70 secured under the head of the screw 68.

It will be apparent that if the above-described switch 20 is positioned in an external magnetic field, the magnetic poles of the magnet assembly 42 will tend to align the magnetic axis thereof with the magnetic lines of the external field thus twisting the wire 34 to bring one end of contact bar 50 into engagement with one or the other of the stationary contacts 52. By changing the direction of the flux lines of the external field, the magnetic assembly 42 is rotatable to twist the wire 34 in the opposite direction bringing the other end of the contact bar 50 into engagement with the other stationary contact 52 so that the switch can be used as a magnetically operated circuit making and breaking device. By making the clearance between the wire 34 and the slot 32 less than the contact spacing, the wire is supported so that vibration and shocks do not cause a false operation of the contacts resulting in a switch which is substantially vibration and shock proof.

The above described magnetic switch 20 has other features which make it useful for other functions than those of a simple circuit making or breaking device. It will be evident that the magnet assembly 42 and contact bar together with the wire 34 form a torsional assembly similar to that shown schematically in Fig. 6. As the maximum spacing between the end of the contact bar 50 and the corresponding stationary contacts 52 is made very small, the engagement thereof minimizes the twisting of the portion of the wire between bar and the adjacent anchor bushing 36. The effective oscillating length of the torsional system is then equal to 2X when the distance between the centers of contact bar 50 and the magnet assembly 42 is made equal to the distance between these elements and the adjacent anchor bushings 36 so that the resonating frequency $f_0$ of the system is given by the expression:

$$f_0 = \frac{d^4}{L \cdot I}$$

where $d$ = diameter of the wire 34.
$L = 2X$ = effective length of the wire 34.
$I$ = moment of inertia of magnet assembly 42 about its axis.

If the relative direction of the magnetic flux of the external field is reversed at approximately the resonating frequency $f_0$ of the torsional system, a condition readily obtainable by using the switch contacts 50—52 to control the condition of such field, the entire system will oscillate at the natural resonant frequency of the switch torsional system. The switch 20 can, therefore, be employed among other uses to control the frequency of an audio amplifier, or to regulate the speed of an electrodynamic machine such as a direct current self-synchronizing motor, either directly or through a suitable amplifier.

Such a directly regulated direct current motor M is shown schematically in Figs. 4 and 5 wherein $W_1$ and $W_2$ designate two stator field windings. The details of the stator windings $W_1$ and $W_2$, the iron portions of the associated magnetic path, and of the rotor bearings which are of conventional design form no part of the present invention and will not be illustrated nor described further. The motor rotor includes a shaft 76 whereupon is carried a magnetic field producing structure which is schematically shown as a simple permanent bar magnet, it being understood that other types of permanent magnets or electromagnets can be substituted therefor.

An oscillatory switch 20, preferably similar to switch 20 described above, is positioned, as is shown in Figs. 4 and 5, within the rotating magnetic field accompanying the rotor magnet 78, so that each time the rotor moves 180° the switch magnetic assembly 42 is subjected to a reversal in the direction of the external field causing the magnet assembly 42 of the switch 20 to subject the wire 34 to a twisting action which transfers the switch contacts 50 and 52. It will be understood that the above mentioned 180° are electrical degrees which correspond to the mechanical degrees of rotation of the rotor only in the simple case of a two-pole rotor and the operation of the switch 20 transfers the contacts each time the switch magnet 42 is subjected to the reversed direction fields of successive poles of a multi-pole machine.

The electrical connections between the switch 20 and the motor windings $W_1$ and $W_2$ are shown in the wiring diagram of Fig. 7 wherein the terminals $t1$ and $t2$ are output terminals of a conventional current power source (not shown). The terminal $t2$ is connected to one end of each of the windings $W_1$ and $W_2$. The terminal $t1$ is connected to the strap 70 of the switch 20 which is at the ground potential of the switch housing 21 and the contact bar 50. The terminals 62 are connected to the other ends of the windings $W_1$ and $W_2$, respectively, so that the windings are alternatively energized depending upon which of the switch contacts 52 is engaged by the contact bar 50.

If it is assumed that the winding $W_1$ is oriented so that a south magnetic pole is formed midway between its diametric ends adjacent the rotor 78, the north pole of the rotor is attracted to the south pole of the winding so that the rotor takes the position shown in Fig. 5. As the rotor is moved into the illustrated position, the south pole of the switch magnetic assembly 42 of the switch 20 is attracted by the north pole of the rotor. The wire 34 is twisted by the movement of the magnetic assembly 42 transferring the bar contact 50 to its alternate position so that the circuit to the winding $W_1$ is interrupted and an alternate circuit established to energize the winding $W_2$. A south magnetic pole is thereby established at the midpoint of the winding $W_2$ which attracts the north pole of the motor rotor 78 so that the rotor revolves 180° from the position illustrated in Fig. 5. Such rotor movement brings the south pole of the rotor 78 adjacent to the switch 20 attracting the north pole of its magnetic assembly 42 of the switch 20 and thereby reversing the position of its bar contact 50. The resulting switching action again energizes the winding $W_1$ to return the rotor to the position illustrated in Fig. 5 thus completing one operating cycle. The switch magnetic assembly 42 again transfers to repeat the above-described operation so that the rotor 78 starts the succeeding cycle.

Figure 9:
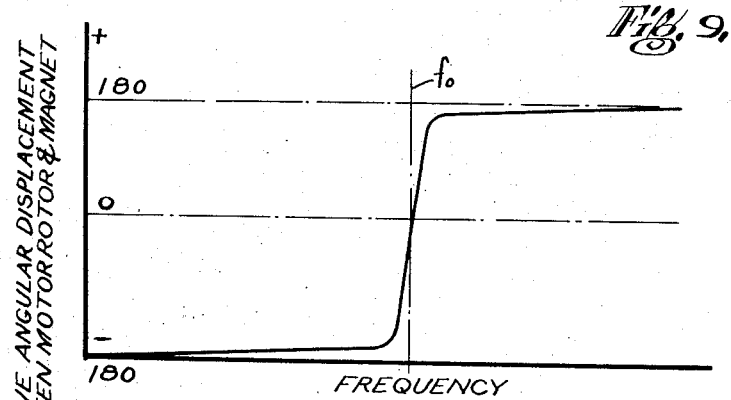
Fig. 9 is a graphical view showing the angular displacement between the magnet and the rotor of the electrodynamic machine as a function of frequency.
Figure 10:
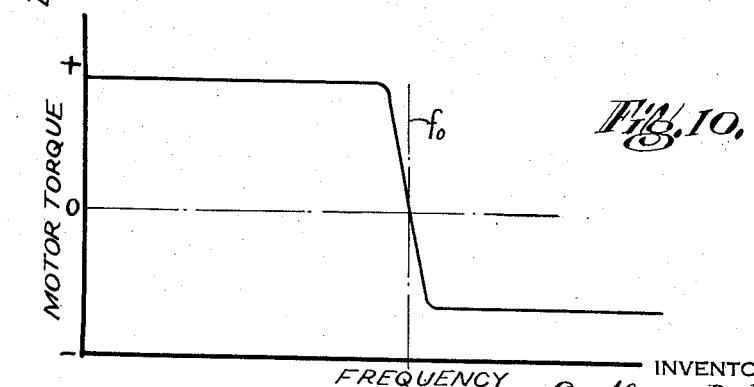
Fig. 10 is a graphical view showing the torque of the electrodynamic machine as a function of frequency.

It will be evident from the various operating characteristics of the above-described magnetic switch controlled motor system, which are illustrated in Figs. 8 to 10, that the frequency of operation of such a system is a function of the frequency of the torsional system of switch 20. As is indicated in Fig. 10, at operating frequencies approaching the resonating frequency $f_0$ of the resonating system of the switch 20, the torque of the motor M decreases rapidly to zero at such resonating frequency and becomes negative at higher frequencies so that the magnetic forces then acting upon the rotor 78 are in a direction to cause the rotor to operate in the reverse direction. It is therefore impossible for the rotor speed to exceed that corresponding to the resonating frequency $f_0$ and the rotor 78 when loaded will assume some speed between the maximum accelerating torque at the upper "knee" of the curve and zero. Because of the steepness of the portion of the torque curve corresponding to the resonating frequency of the switch, the speed range between maximum and zero torque is very narrow and the speed regulation correspondingly good.

To obtain a useful operating life, the maximum angular movement of the magnet assembly 42 must not result in a stress in the outer elements of the wire 34, which exceeds elastic limit of the material. It will be evident from the high peak of the resonance curve of Fig. 8, that the angular movement of the switch magnet assembly 42 is approximately 200 times as great at the resonating frequency $f_0$ as is its movement at non-resonant frequencies so that with a maximum allowable stress the angular movement of the magnet assembly at starting may not be enough to move the ends of the contact bar 50 into engagement with the respective stationary contacts 52. One manner in which a greater starting movement of the switch torsional assembly can be obtained is by shifting the location of the switch 20 approximately 30° from the neutral diameter between the coils $W_1$ and $W_2$ to the position shown in Fig. 5. Such shift in the relative position of the switch causes a corresponding angular displacement between the motor rotor 78 and the switch magnet assembly 42 so that the starting operating point is brought over the lower "knee" onto the steep portion of the curve shown in Fig. 9. This point corresponds to the vertical portion of the resonant curve of Fig. 8 so that sufficient movement of the switch contact bar 50 to contact the staionary contacts 52 can be obtained when starting wihout exceeding the elastic limit of the wire 34 under resonant conditions.

There is also the possibility that the motor rotor 78 may come to rest in such a position that the switch magnet assembly 42 is in a neutral position wherein neither end of the bar 50 is in engagement with a respective stationary contact 52. To preclude the occurrence of this condition wherein neither coil $W_1$ or $W_2$ can be energized, a pair of small permanent magnets 80 are embedded in the coils with the proper orientation so that the rotor is always brought to rest in the same position wherein the contact bar engages one of the stationary contacts.

The starting characteristics are also improved by connecting the contacts of a non-resonant magnetically operated switch in parallel with the contacts of the resonating switch. Although such non-resonant switch can be an entirely separate unit, I prefer to incorporate it in the housing with the resonant switch as in the second embodiment of Fig. 11. In the latter embodiment, the housing 120 includes a recessed body 122 to the top of which is secured a cover plate 124. Suspended within the housing 120 by means of bushings 136 is a torsional assembly consisting of a wire 134 upon which are carried in spaced relationship a magnetic assembly 142 and a contact bar 150 generally similar to the magnetic assembly 42 and the contact bar 50 described in detail heretofore. The wire 134 engages a groove 132 in a cross rib 123 wherein the wire is held by a strap 125. The operation of the above-described resonant portion of the second embodiment is analogous to that of the first embodiment described in detail heretofore, the magnetic assembly 142 being influenced by the external field of the associated motor rotor to torque the wire 134 and alternately bring the ends of the contact bar 150 into engagement with two stationary contacts 152 extending upwardly from the bottom of the housing body 122.

A non-resonant magnetically operated switch is also incorporated in the housing 120 of the second embodiment. The latter switch comprises a contact bar 155 of a material having a high magnetic retentivity so that the bar can be permanently magnetized. The contact bar 155 is pivotally mounted at its central point upon a pin 157 which is secured by a set screw 159 in an aperture in a boss 161 on the bottom surface of the cover plate 124. Lateral movement of the contact bar 155 axially of the pin 157 is prevented by a spacer 163 and the head 165 of the pin. A low resistance electrical connection between the pin 157 and the contact bar 155 is provided by a flexible conducting pigtail 166, the ends of which are soldered respectively to the bar and the head 165. Each end of the bar carries a precious metal contact 168 which engages a respective stationary contact 167 projecting upwardly from the housing body 122.

The operation of the parallel connected resonant and non-resonant switches can best be understood by reference to Fig. 12. Since the magnetic bar 155 is freely pivoted, it is obvious that the non-resonant switch has no frequency characteristics of its own and merely serves to start and accelerate the associated motor to a speed near the resonant frequency of the resonant switch, at which point regulation begins. The operation of both switches in parallel is depicted in the curves of Fig. 12, where it is shown that the non-resonant switch attempts to accelerate the motor to some speed above the resonant frequency $f_0$. However, the phase reversal of the resonant switch applies a negative torque to the motor to counteract this acceleration. The motor will therefore stabilize at some speed slightly above the resonant frequency $f_0$, at which the negative torque will equal the positive torque less than that required to overcome friction and windage at that speed.

Theoretically, the optimum position for the non-resonant switch is 90° from the coil axis so that switching occurs at the instant the magnet rotor passes the coil axis. However, since the non-resonant switch inherently has a certain amount of mechanical lag, it is necessary to advance the switch to a position where it leads by a compensating amount. As a result of this lag, it will be apparent that the phase shift varies with frequency and, for maximum acceleration, that it would be best to advance its position with respect to the motor coils as the motor speed or frequency increases. A position is, therefore, chosen empirically which provides a satisfactory running condition. Such phasing is not ideal for the starting condition since at low speeds switching occurs before the magnet reaches the coil axis, and it is therefore necessary to make sure that the magnet, at stand still, is in such a position that it will attain enough inertia in the first half revolution to pass the coil axis and continue to accelerate from that point.

This is accomplished by placing the small permanent magnets 80 in the coil assembly of the motor which causes the rotor magnet to come to rest in the same position each time. These magnets 80 also prevent the rotor from stopping in a position where neither contact will be closed as was described in connection with the first embodiment.

It should be understood that the present disclosure is for the purpose of illustration only and that this invention includes all modifications and equivalents which fall within the scope of the appended claims.

What is claimed is:

1. An oscillatory switch comprising an enclosing housing having separated cavities therein interconnected by a slot, a torsionally oscillating assembly within said housing, said system including an elongated torsional spring member whose ends are fixed to said housing, said member lying in said slot so that said member is supported laterally, a permanent magnet secured to a point on said member intermediate the ends thereof and disposed in one of said housing cavities, a rigid contact bar attached to said member and extending normally on either side of said member in said other of said cavities, and two stationary contacts positioned in said other adjacent opposite ends of said contact bar so that said contacts are alternatively engaged by the ends of said contact bar as said torsional assembly oscillates about the axis of said elongated member when said permanent magnet is subjected to a varying external magnetic field, the distance between each stationary contact and said contact bar being less than the distance between said elongated torsional spring member and the wall of said slot.

2. A magnetically operated switch device comprising a support, a torsional spring member mounted on said support, a first means attached to one portion of said torsional member for producing a unidirectional magnetic field, a second means for producing a second magnetic field adapted to interact with said unidirectional field to drive said torsional spring member, a first contact on said support, and a second contact fixed adjacent to said first contact and to another portion of said torsional spring member to be driven thereby whereby movement of said torsional spring member by said first means moves said first and second contacts relative to each other.

3. A magnetically operated switch comprising a support and an elongated torsional spring member mounted on said support, means for twisting said torsional spring member, said means including a magnet fixed to one portion of said torsional spring member and adapted to be subjected to an external magnetic field, a first contact fixed to said support, and a second contact mounted adjacent to said first contact and on another portion of said torsional spring member to be driven thereby, whereby rotation of said torsional spring member by said magnet moves said first and second contacts relative to each other.

4. A magnetically operated switch comprising a support, an elongated torsional spring member, means fixedly mounting the ends of said torsional spring member on said support, a magnet fixed to said elongated torsional spring member intermediate said ends thereof and adapted to be subjected to an external magnetic field, a first contact mounted on said support, and a second contact mounted to a portion of said elongated torsional spring member intermediate said ends thereof and spaced from said magnet by said spring member, said second contact being adjacent to said first contact whereby twisting of said torsional spring member by movement of said magnet will move said second contact into and out of contact with said first contact.

5. A magnetically operated switch comprising a support, an elongated torsional spring member mounted on said support, a magnet fixed to said elongated torsional spring member intermediate said ends thereof and adapted to be subjected to an alternating external magnetic field to oscillate said spring member about its longitudinal axis, a first contact mounted on said support, and a second contact comprising a contact bar transversely fixed to a portion of said elongated torsional spring member intermediate said ends thereof and spaced from said magnet by said spring member, said contact bar being adjacent to said first contact whereby oscillations of said torsional spring member by said magnet will move said contact bar into and out of contact with said first contact.

6. A magnetically operated switch comprising a support, a torsional oscillating assembly mounted on said support, said assembly including an elongated torsional spring member mounted for rotation about its longitudinal axis on said support and a permanent magnet fixed to said elongated torsional spring member intermediate the ends thereof and adapted to be subjected to an alternating external magnetic field to oscillate said spring member about its longitudinal axis, a pair of spaced contacts mounted on said support, and a contact bar transversely fixed to a portion of said elongated torsional spring member intermediate said ends thereof and spaced from said permanent magnet by said spring member, said contact bar being positioned between said pair of spaced contacts whereby oscillation of said torsional spring member by said magnet will move said contact bar alternately into and out of contact with said pair of contacts.

7. A constant speed electrodynamic machine comprising means for producing two interacting fields, said means including a pair of magnets, means mounting said magnets adjacent to each other, switching means for periodically varying the direction of the field of one of said pair of magnets, means for operating said switching means and including an oscillatory system having a magnet in the field of the other one of said pair of magnets to drive said oscillatory system to a resonant frequency thereof, whereby the field of said one of said pair of magnets is varied at said resonant frequency.

8. A constant speed electrodynamic machine comprising means for producing two interacting fields, said means including a pair of magnets, means mounting said magnets adjacent to each other and for movement relative to each other, switching means for periodically varying the direction of the field of one of said pair of magnets, means for operating said switching means and including an oscillatory system having a magnet in the field of the other one of said pair of magnets to drive said oscillatory system to a resonant frequency thereof, whereby the field of said one of said pair of magnets is varied at said resonant frequency.

9. A constant speed electrodynamic machine comprising means for producing two interacting fields, said means including a first and a second magnet, means mounting said first magnet for rotation adjacent to said second magnet to be driven thereby, switching means for periodically varying the direction of the field of one of said magnets, means for operating said switching means and including an oscillating system having an elongated torsional spring member, means mounting said spring member for oscillation about its longitudinal axis, a magnet mounted on said elongated spring member in the field of said first magnet to drive said spring member to resonant frequency whereby the field of said one magnet is varied at said resonant frequency.

10. A constant speed electrodynamic machine comprising means for producing two interacting fields, said means including a rotor magnet and a stator magnet for driving said rotor magnet, means mounting said rotor magnet for rotation adjacent to said stator magnet, switching means for periodically varying the direction of the field of one of said magnets, means for operating said switching means and including an oscillatory system having a magnet in the field of said rotor magnet to drive said oscillatory system to a resonant frequency thereof whereby said field of said one magnet is varied at said resonant frequency.

11. A constant speed electrodynamic machine comprising means for producing two interacting fields, said means including a rotor magnet and a stator magnet for driving said rotor magnet, means mounting said rotor magnet for rotation adjacent to said stator magnet, switching means for periodically varying the direction of the field of said stator magnet, means for operating said switching means and including an oscillatory system having a magnet in the field of said rotor magnet to drive said oscillatory system to a resonant frequency thereof, whereby said field of said stator magnet is varied at said resonant frequency.

12. A constant speed electrodynamic machine comprising means for producing two interacting fields, said means including a rotor magnet and a stator magnet for driving said rotor magnet, means mounting said rotor magnet for rotation adjacent to said stator magnet, switching means for periodically varying the direction of the field of said stator magnet, means for operating said switching means and including an elongated torsional spring member, means mounting said spring member for oscillation about its longitudinal axis, a magnet mounted on said elongated spring member in the field of said rotor magnet to drive said spring member to a resonant frequency, whereby the field of said stator magnet is varied at said resonant frequency.

13. A constant speed electrodynamic machine comprising means for producing two interacting fields, said means including a rotor magnet and a stator magnet winding for driving said rotor magnet, means mounting said rotor magnet for rotation adjacent to said stator winding, switching means connected to said stator winding for varying the direction of the field of said stator winding, means for operating said switching means and including an elongated torsional spring member, means mounting said spring member for oscillation about its longitudinal axis, a magnet mounted on said elongated spring member in the field of said rotor magnet to drive said spring member to a resonant frequency, a pair of spaced contacts, and a contact bar transversely fixed to a portion of said elongated torsional spring member intermediate said ends thereof and spaced from said permanent magnet by said spring member, said contact bar being positioned between said pair of spaced contacts whereby oscillation of said torsional spring member by said magnet will move said contact bar alternately into and out of contact with said pair of contacts.

References Cited in the file of this patent

UNITED STATES PATENTS

| | | |
|---|---|---|
| 2,206,667 | Field | July 2, 1940 |
| 2,546,284 | Weisbecker | Mar. 27, 1951 |
| 2,568,100 | Vanderleck | Sept. 18, 1951 |
| 2,635,155 | Barr | Apr. 14, 1953 |
| 2,640,866 | Powell | June 2, 1953 |
| 2,798,995 | McLean | July 9, 1957 |